(12) United States Patent
Schroepfer

(10) Patent No.: US 6,666,525 B1
(45) Date of Patent: Dec. 23, 2003

(54) SPOKED WHEEL APPARATUS

(76) Inventor: David J. Schroepfer, 32010 Spruce La., Trinidad, CO (US) 81082

( * ) Notice: Subject to any disclaimer, the term of this patent is extended or adjusted under 35 U.S.C. 154(b) by 0 days.

(21) Appl. No.: 10/173,086

(22) Filed: Jun. 17, 2002

(51) Int. Cl.$^7$ .............................. B60B 1/00; B60B 1/02
(52) U.S. Cl. ...................... 301/80; 301/104; 301/110.5; 301/58
(58) Field of Search .............................. 301/80, 79, 84, 301/104, 110.5, 55, 58, 56, 57, 59, 61, 67, 73, 74, 75, 78

(56) References Cited

U.S. PATENT DOCUMENTS

| | | | | |
|---|---|---|---|---|
| 2,916,329 | A | * 12/1959 | Gilbert | 301/55 |
| 3,993,357 | A | * 11/1976 | Reppert | 301/58 |
| 4,275,931 | A | * 6/1981 | Reppert | 301/35.57 |
| 6,126,243 | A | * 10/2000 | Okajima et al. | 301/58 |
| 6,205,664 | B1 | * 3/2001 | Cappellotto | 29/894.33 |
| 6,213,562 | B1 | * 4/2001 | Muraoka et al. | 301/61 |
| 6,234,580 | B1 | * 5/2001 | Muraoka et al. | 301/58 |
| 6,367,883 | B1 | * 4/2002 | Chen | 301/55 |
| 6,409,278 | B1 | * 6/2002 | Nakajima | 301/59 |
| 6,428,113 | B2 | * 8/2002 | Dietrich | 301/59 |
| 6,431,658 | B1 | * 8/2002 | Nakajima et al. | 301/59 |
| 6,485,108 | B1 | * 11/2002 | Tabe | 301/59 |

* cited by examiner

*Primary Examiner*—S. Joseph Morano
*Assistant Examiner*—Long Bao Nguyen

(57) ABSTRACT

The spoked wheel apparatus is symmetrical, is reversible, employs spokes that are threaded on both ends, and is capable of supporting a tubeless tire, without air leaking from the tire. A hub assembly for the wheel apparatus includes two sides, and each side includes a plurality of alternately crossing spokes that are connected between the hub assembly and a wheel rim portion. Each hub side includes an interchangeable and reversible drive dowel assembly capable of receiving a drive sprocket or disc brake. For a hub side, some spokes are connected between outer portions of the hub side to the wheel rim portion, and some spokes are connected between inner portions of the hub side to the wheel rim portion. Alternating pairs of inner and outer spokes come into interference contact midway between the hub assembly and the wheel rim portion, whereby strengthening and stabilizing effects are provided between the interfering spokes.

16 Claims, 5 Drawing Sheets

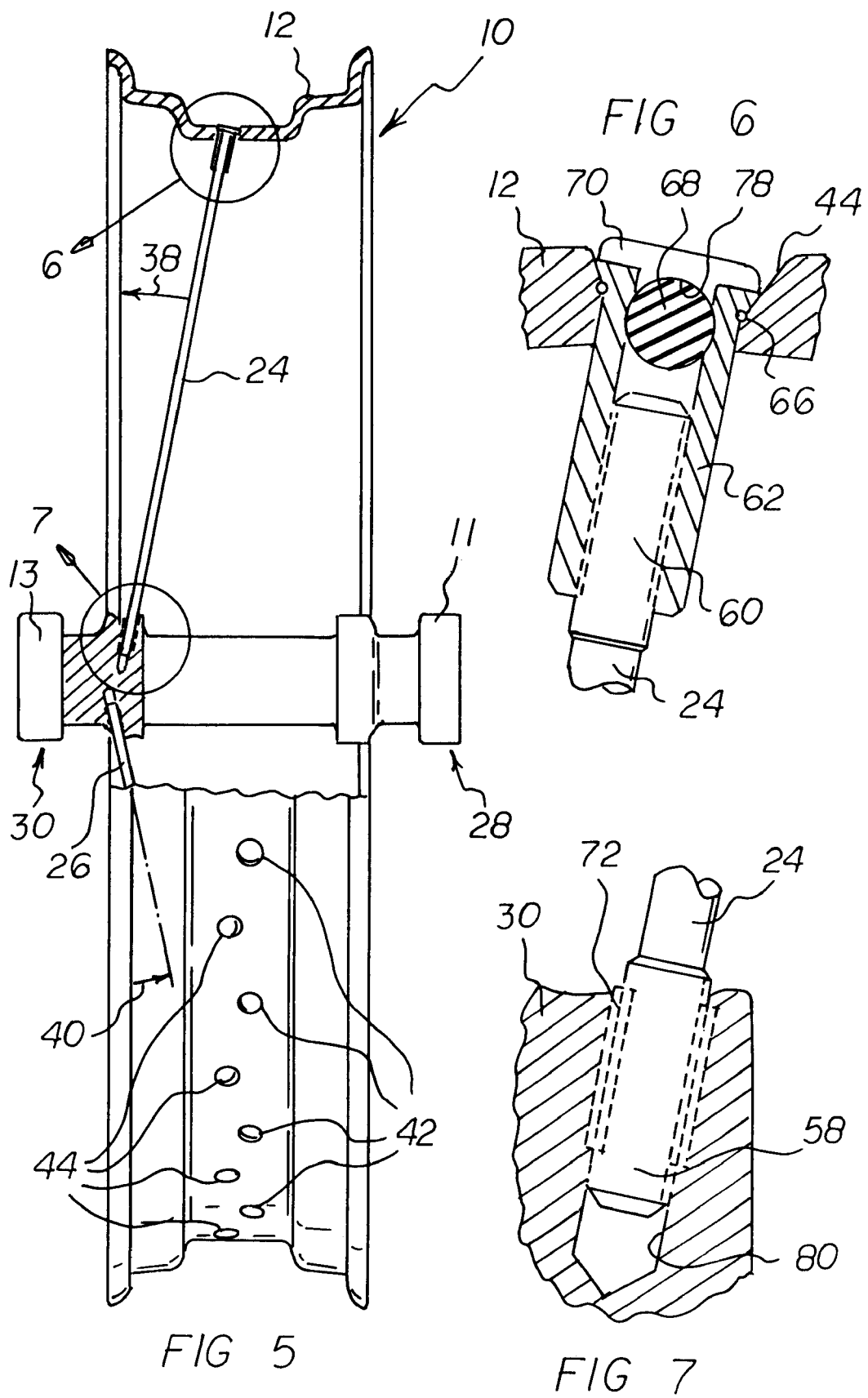

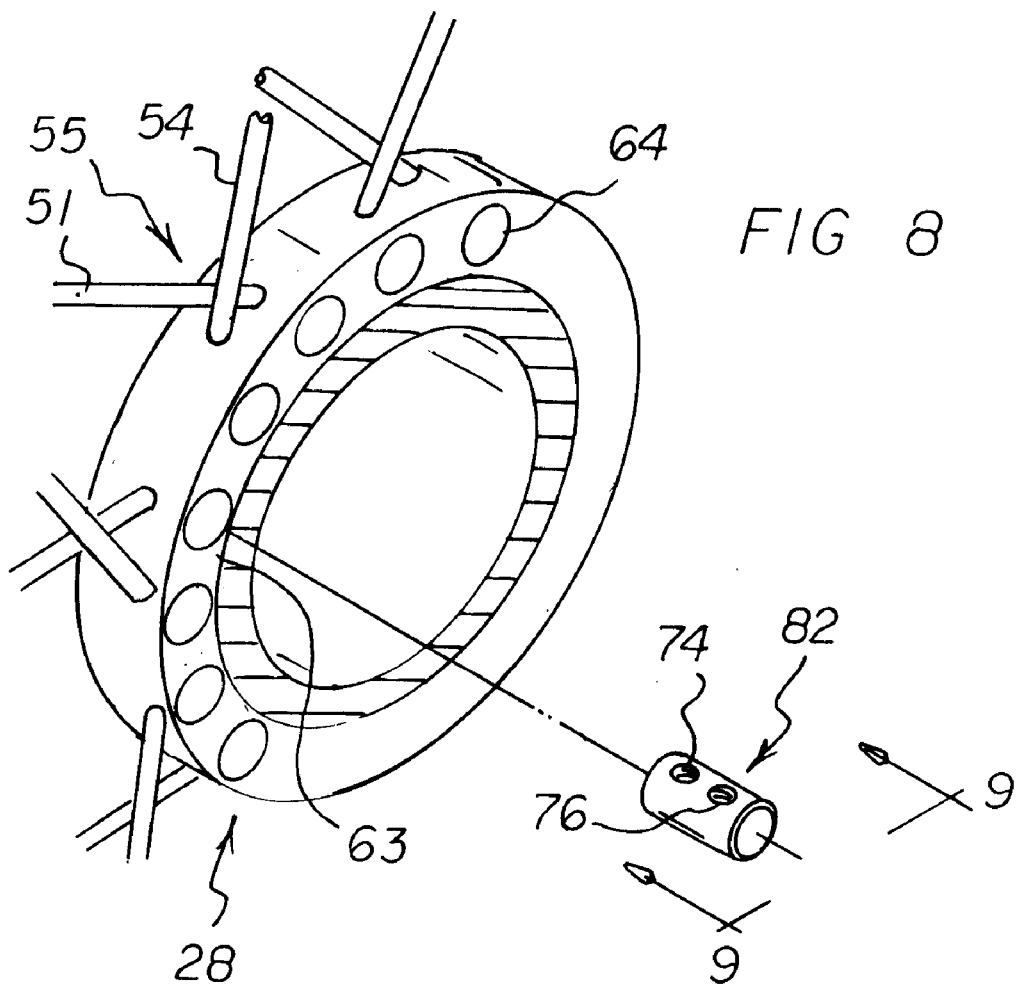
FIG 8
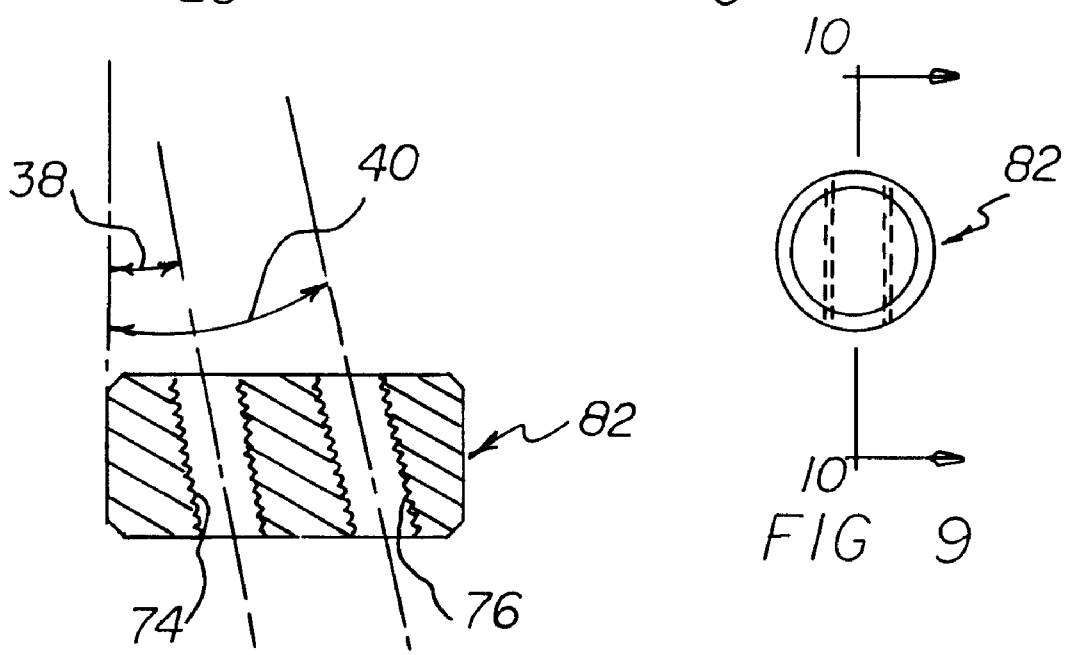
FIG 9
FIG 10

SPOKED WHEEL APPARATUS

BACKGROUND OF THE INVENTION

1. Field of the Invention

The present invention relates generally to wheels and, more particularly, to spoked wheels especially adapted for use on two-wheeled vehicles, such as motorcycles.

2. Description of the Prior Art

Spoked wheels are well known in the art of two-wheeled vehicles. Of special interest are two-wheeled motorcycles known as "dirt trackers". What makes a "dirt tracker" motorcycle unique is the fact that the direction in which they race is generally counter-clockwise. This type of racing wears out a tire (which is very important in racing) on one side before the other. This aspect of motorcycle racing has led to "reversible" wheels. More specifically, "reversible" wheels are wheels that can be flipped over to use the good side of the tire and still mount a sprocket or brake with the same orientation as before reversal. In this respect, it would be desirable if a spoked wheel apparatus were provided which is reversible.

The common wheel size for "dirt tracker" motorcycles is dictated by the selection of tires available for the sport. The most common tire is the Goodyear, 19 inch (in diameter) Dirt Track Tire. In addition, Dunlop, Pirelli, Continental, etc. also make suitable tires for the "dirt tracker". The rims come in various widths to accommodate various tire widths, which are still 19 inch in diameter. The previous rim sizes were called WM6, WM5, and WM4.5, to mention a few. It is noted that for many years, the front wheels on most street bikes were 19 inch wheels. The "WM" numbers are "wheel manufacturers" numbers and relate to width of the rim, 3.50 inches, 3.00 inches, and 2.75 inches, respectively. These rims have been in production for the past 35 years. Sun Rims makes the WM6 and the WM4.5. Excel (in Japan) makes the WM5. In earlier years, an assortment of sizes were available from Akront, DID, Borrani, etc. Not all of the above-mentioned rims comply with the American Tire and Rim Association Motorcycle Tubeless specifications MT3.50, MT3.00, and MT2.75. In this respect, it would be desirable if a spoked wheel apparatus were provided which complies with the American Tire and Rim Association Motorcycle Tubeless specifications MT3.50, MT3.00, and MT2.75.

Throughout the years, many innovations in the art of spoked wheel apparatuses have been described. In this respect, special attention is directed to U.S. Pat. No. 5,487,592, incorporated herein by reference, which discloses a spoked wheel apparatus which is not symmetrical about a medial plane. To facilitate reversibility, it would be desirable if a spoked wheel apparatus were provided which is symmetrical about a medial plane.

Some spoked wheels employ spokes having threads at one end and dog-legged ends at the other end. For greater control in positioning and providing tension on the spokes, it would be desirable if a spoked wheel apparatus were provided which includes threads at both ends of the spokes.

Generally, spoked wheel apparatuses are used with tires and internal tubes. This is especially true with "dirt tracker" motorcycles. Simply stated, air-tight seals are not provided between the spokes and the rims. To lighten the overall weight of a "dirt tracker" motorcycle, it would be desirable if a spoked wheel apparatus were provided that can employ tubeless tires.

In a spoked wheel apparatus, a great deal of stress is exerted on the hub ends of the spokes and the spoke reception wells in the hub. Along with this stress, an accompanying risk of stripping the spoke reception wells occurs. To avoid stripping the spoke reception wells, it would be desirable if a spoked wheel apparatus were provided which included spoke well inserts that provide a strong, stress-resistant connection between threaded ends of spokes and spoke reception wells.

Still other features would be desirable in a spoked wheel apparatus. For example, spokes that are supported only at their respective ends, in the rim and the hub, do not have any intermediate support. To provide greater support to spokes that are supported at their respective hub and rim ends, it would be desirable if spokes had intermediate support between the hub and rim ends.

Thus, while the foregoing body of prior art indicates it to be well known to use spoked wheel apparatuses, the prior art described above does not teach or suggest a spoked wheel apparatus which has the following combination of desirable features: (1) is reversible; (2) complies with American Tire and Rim Association Motorcycle Tubeless specifications; (3) is symmetrical about a medial plane; (4) includes threads at both ends of the spokes; (5) can employ tubeless tires; (6) includes spoke well inserts that provide a strong, stress-resistant connection between threaded ends of spokes and spoke reception wells; and (7) provides intermediate support between the hub and rim ends. The foregoing desired characteristics are provided by the unique spoked wheel apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a spoked wheel apparatus which includes a wheel rim portion that includes a circular locus of spoke reception channels. A hub assembly includes a first hub side and a second hub side. The first hub side includes reception positions for outer, first-side spokes and reception positions for inner, first-side spokes. The reception positions for outer, first-side spokes are oriented in a first circular direction around the first hub side and are oriented toward the circular locus of spoke reception channels at an outside-hub-to-rim angle. The reception positions for inner, first-side spokes are oriented in a second circular direction around the first hub side and are oriented toward the circular locus of spoke reception channels at an inside-hub-to-rim angle.

The second hub side includes reception positions for outer, second-side spokes and reception positions for inner, second-side spokes. The reception positions for outer, second-side spokes are oriented in a first circular direction around the second hub side and are oriented toward the circular locus of spoke reception channels at the outside-hub-to-rim angle. The reception positions for inner, second-side spokes are oriented in a second circular direction around the second hub side and are oriented toward the circular locus of spoke reception channels at the inside-hub-to-rim angle.

The outside-hub-to-rim angle is greater than the inside-hub-to-rim angle. The reception positions in the first hub side for the first-side spokes are offset from respective reception positions in the second hub side for the second-side spokes by a hub-reception-position offset angle.

An overall set of spokes is interconnected between the wheel rim portion and the hub assembly. The overall set of spokes includes a subset of spokes connected between the hub reception positions for outer, first-side spokes and the circular locus of spoke reception channels. The overall set of spokes also includes a subset of spokes connected between the hub reception positions for inner, first-side spokes and the circular locus of spoke reception channels.

In addition, a subset of spokes is connected between the hub reception positions for outer, second-side spokes and the circular locus of spoke reception channels. Also, a subset of spokes is connected between the hub reception positions for inner, second-side spokes and the circular locus of spoke reception channels.

Because the outside-hub-to-rim angle is greater than inside-hub-to-rim angle, the outer, first-side spokes and the inner, first-side spokes engage in interference contacts at respective locations between the circular locus of spoke reception channels and the first hub side. Similarly, the outer, second-side spokes and the inner, second-side spokes engage in interference contacts at respective locations between the circular locus of spoke reception channels and the second hub side. The interference contacts between spokes provide stabilizing spoke tension between contacting spokes.

A first drive dowel assembly is connected to the first hub side. A second drive dowel assembly is connected to the second hub side.

Spoke-to-rim connection means are provided for connecting the spokes to the wheel rim portion, and spoke-to-hub connection means are provided for connecting the spokes to the hub assembly.

Preferably, the wheel rim portion includes a first-side, circular locus of first-side spoke reception channels and a second-side, circular locus of second-side spoke reception channels, wherein each of the first-side, circular locus of first-side spoke reception channels and the second-side, circular locus of second-side spoke reception channels are on opposite sides of a medial rim plane.

Preferably, the first hub side includes reception positions for outer, first-side spokes and reception positions for inner, first-side spokes. The reception positions for outer, first-side spokes are oriented in a first circular direction around the first hub side and are oriented toward the first-side, circular locus of first-side spoke reception rim channels at an outside-hub-to-rim angle. The reception positions for inner, first-side spokes are oriented in a second circular direction around the first hub side and are oriented toward the first-side, circular locus of first-side spoke reception rim channels at an inside-hub-to-rim angle.

Preferably, the second hub side includes reception positions for outer, second-side spokes and reception positions for inner, second-side spokes. The reception positions for outer, second-side spokes are oriented in a first circular direction around the second hub side and are oriented toward the second-side, circular locus of second-side spoke reception rim channels at the outside-hub-to-rim angle. The reception positions for inner, second-side spokes are oriented in a second circular direction around the second hub side and are oriented toward the second-side, circular locus of second-side spoke reception rim channels at the inside-hub-to-rim angle.

Preferably, the overall set of spokes includes a subset of spokes connected between the hub reception positions for outer, first-side spokes and the first-side, circular locus of first-side spoke reception rim channels. A subset of spokes is connected between the hub reception positions for inner, first-side spokes and the first-side, circular locus of first-side spoke reception rim channels. A subset of spokes is connected between the hub reception positions for outer, second-side spokes and the second-side, circular locus of second-side spoke reception rim channels, and a subset of spokes is connected between the hub reception positions for inner, second-side spokes and the second-side, circular locus of second-side spoke reception rim channels.

The first circular direction is opposite the second circular direction. The first circular direction can be clockwise, and the second circular direction can be counterclockwise.

The spoke-to-hub connection means include hub-located spoke reception wells, and external-thread-receiving spoke well inserts are installed in the hub-located spoke reception wells. The external threads of the hub spoke ends are engaged with respective spoke well inserts for connecting the respective spokes to the hub assembly.

The hub-located spoke reception wells include axially oriented hub-located spoke reception wells, and the spoke well inserts include axially oriented spoke well inserts. Each spoke well insert is comprised of a metal which has a hardness greater than the hardness of the hub assembly and greater than the hardness of the spokes.

The hub-located spoke reception wells include transversely oriented spoke nut reception wells in the hub assembly, and the spoke well inserts include transversely oriented spoke well inserts that are installed into the transversely oriented spoke nut reception wells.

Each of the transversely oriented spoke well inserts includes an internally threaded outer spoke reception well which is oriented at an outside-hub-to-rim angle, and includes an internally threaded inner spoke reception well which is oriented at an inside-hub-to-rim angle. The outside-hub-to-rim angle is greater than the inside-hub-to-rim angle.

In accordance with another aspect of the invention, a spoked wheel apparatus includes a wheel rim portion which includes rim-located spoke reception channels. A hub assembly includes hub-located spoke reception channels. An overall set of spokes is connected between the wheel rim portion and the hub assembly. Each spoke in the overall set of spokes includes a rim spoke end and a hub spoke end, and each respective rim spoke end and hub spoke end is externally threaded. Spoke-to-rim connection means are provided for connecting each respective rim spoke end to each respective rim-located spoke reception channel. Spoke-to-hub connection means are provided for connecting each hub spoke end to each respective hub-located spoke reception channel.

Preferably, the spoke-to-rim connection means include an internally threaded spoke-to-rim nipple received in a respective rim-located spoke reception channel for receiving a respective rim spoke end. An interior nipple seal is located inside the spoke-to-rim nipple. An exterior nipple-to-rim seal is located between the spoke-to-rim nipple and the respective rim-located spoke reception channel. A nipple cap is connected to a top portion of the spoke-to-rim nipple for retaining the interior nipple seal inside the spoke-to-rim nipple. Each respective rim-located spoke reception channel is inwardly bevelled.

Preferably, the exterior nipple-to-rim seal is in a form of an elastic O-ring, and the interior nipple seal is in a form of an elastic ball. The nipple cap includes a cup-like bottom surface for receiving the elastic ball.

The spoke-to-rim nipple, the exterior nipple-to-rim seal, and the interior nipple seal provide an air-tight seal between the spoke and the wheel rim portion. As a result, the spoked wheel apparatus of the invention can be used with tubeless tires.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining at least two preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved spoked wheel apparatus which has all of the advantages of the prior art and none of the disadvantages.

It is another object of the present invention to provide a new and improved spoked wheel apparatus which may be easily and efficiently manufactured and marketed.

It is a further object of the present invention to provide a new and improved spoked wheel apparatus which is of durable and reliable construction.

An even further object of the present invention is to provide a new and improved spoked wheel apparatus which is susceptible of a low cost of manufacture with regard to both materials and labor, and which accordingly is then susceptible of low prices of sale to the consuming public, thereby making such spoked wheel apparatus available to the buying public.

Still yet a further object of the present invention is to provide a new and improved spoked wheel apparatus which is reversible.

Still another object of the present invention is to provide a new and improved spoked wheel apparatus that complies with American Tire and Rim Association Motorcycle Tubeless specifications.

Yet another object of the present invention is to provide a new and improved spoked wheel apparatus which is symmetrical about a medial plane.

Even another object of the present invention is to provide a new and improved spoked wheel apparatus that includes threads at both ends of the spokes.

Still a further object of the present invention is to provide a new and improved spoked wheel apparatus which can employ tubeless tires.

Yet another object of the present invention is to provide a new and improved spoked wheel apparatus that includes spoke well inserts that provide a strong, stress-resistant connection between threaded ends of spokes and spoke reception wells.

Still another object of the present invention is to provide a new and improved spoked wheel apparatus which provides intermediate support between the hub and rim ends.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 5 is a cross-sectional view of the embodiment of the invention shown in FIG. 2 taken along line 5—5 thereof.

FIG. 6 is an enlarged view of the circled portion 6 in FIG. 5 showing the interconnection between a spoke and the wheel rim portion.

FIG. 7 is an enlarged view of the circled portion 7 in FIG. 5 showing the interconnection between a spoke and the hub assembly.

FIG. 8 is a partially exploded, schematic perspective view of a portion of a second embodiment of the invention in which spoke well inserts are employed in the hub assembly.

FIG. 9 is an end view of the spoke well insert of FIG. 8, taken along line 9—9 thereof.

FIG. 10 is a cross-sectional view of the spoke well insert of FIG. 9 taken along line 10—10 thereof, wherein the inside-hub-to-rim angle and the outside-hub-to-rim angle are shown.

DESCRIPTION OF THE PREFERRED EMBODIMENT

Figure 1:
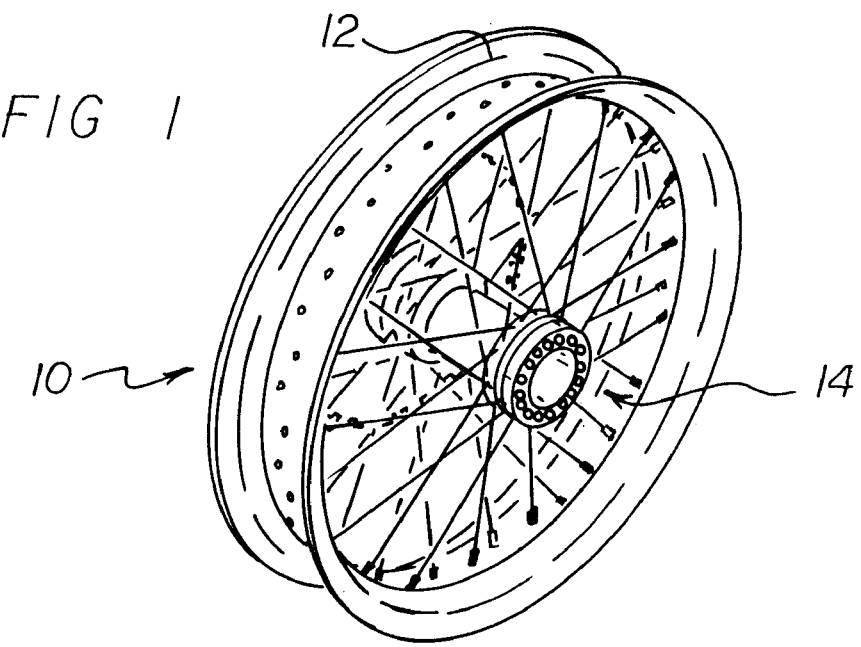
FIG. 1 is a first-side perspective view showing a first embodiment of the spoked wheel apparatus of the invention, wherein a drive sprocket is positioned on a second side for clarity.

With reference to the drawings, a new and improved spoked wheel apparatus embodying the principles and concepts of the present invention will be described.

Turning to FIGS. 1–7, there is shown a first embodiment of the spoked wheel apparatus of the invention generally designated by reference numeral 10. In this embodiment, the spoked wheel apparatus 10 includes a wheel rim portion 12 that includes a circular locus of spoke reception channels. A hub assembly 14 includes a first hub side 28 and a second hub side 30. The first hub side 28 includes reception positions for outer, first-side spokes 22 and reception positions for inner, first-side spokes 20. The reception positions for outer, first-side spokes 22 are oriented in a first circular direction around the first hub side 28 and are oriented toward the circular locus of spoke reception channels at an outside-hub-to-rim angle 40. The reception positions for inner, first-side spokes 20 are oriented in a second circular direction around the first hub side 28 and are oriented toward the circular locus of spoke reception channels at an inside-hub-to-rim angle 38.

The second hub side 30 includes reception positions for outer, second-side spokes 26 and reception positions for inner, second-side spokes 24. The reception positions for outer, second-side spokes 26 are oriented in a first circular direction around the second hub side 30 and are oriented toward the circular locus of spoke reception channels at the outside-hub-to-rim angle 40. The reception positions for inner, second-side spokes 24 are oriented in a second circular direction around the second hub side 30 and are oriented toward the circular locus of spoke reception channels at the inside-hub-to-rim angle 38.

The outside-hub-to-rim angle 40 is greater than the inside-hub-to-rim angle 38. The reception positions in the first hub side 28 for the first-side spokes are offset from respective reception positions in the second hub side 30 for the second-side spokes by a hub-reception-position offset angle 36.

An overall set of spokes is interconnected between the wheel rim portion 12 and the hub assembly 14. The overall set of spokes includes a subset of spokes connected between the hub reception positions for outer, first-side spokes 22 and the circular locus of spoke reception channels. The overall set of spokes also includes a subset of spokes connected between the hub reception positions for inner, first-side spokes 20 and the circular locus of spoke reception channels.

In addition, a subset of spokes is connected between the hub reception positions for outer, second-side spokes 26 and the circular locus of spoke reception channels. Also, a subset of spokes is connected between the hub reception positions for inner, second-side spokes 24 and the circular locus of spoke reception channels.

Because the outside-hub-to-rim angle 40 is greater than inside-hub-to-rim angle 38, the outer, first-side spokes 22 and the inner, first-side spokes 20 engage in interference contacts at respective locations between the circular locus of spoke reception channels and the first hub side 28. Similarly, the outer, second-side spokes 26 and the inner, second-side spokes 24 engage in interference contacts at respective locations between the circular locus of spoke reception channels and the second hub side 30. The interference contacts between spokes provide stabilizing spoke tension between contacting spokes.

A first drive dowel assembly 11 is connected to the first hub side 28. A second drive dowel assembly 13 is connected to the second hub side 30. The first drive dowel assembly 11 and the second drive dowel assembly 13 are fitted to interchangeably and reversibly receive sprockets and disc brakes.

Spoke-to-rim connection means are provided for connecting the spokes to the wheel rim portion 12, and spoke-to-hub connection means are provided for connecting the spokes to the hub assembly 14.

Preferably, the wheel rim portion 12 includes a first-side, circular locus of first-side spoke reception channels 42 and a second-side, circular locus of second-side spoke reception channels 44, wherein each of the first-side, circular locus of first-side spoke reception channels 42 and the second-side, circular locus of second-side spoke reception channels 44 are on opposite sides of a medial rim plane 48.

Preferably, the first hub side 28 includes reception positions for outer, first-side spokes 22 and reception positions for inner, first-side spokes 20. The reception positions for outer, first-side spokes 22 are oriented in a first circular direction around the first hub side 28 and are oriented toward the first-side, circular locus of first-side spoke reception rim channels 42 at an outside-hub-to-rim angle 40. The reception positions for inner, first-side spokes 20 are oriented in a second circular direction around the first hub side 28 and are oriented toward the first-side, circular locus of first-side spoke reception rim channels 42 at an inside-hub-to-rim angle 38.

Preferably, the second hub side 30 includes reception positions for outer, second-side spokes 26 and reception positions for inner, second-side spokes 24. The reception positions for outer, second-side spokes 26 are oriented in a first circular direction around the second hub side 30 and are oriented toward the second-side, circular locus of second-side spoke reception rim channels 44 at the outside-hub-to-rim angle 40. The reception positions for inner, second-side spokes 24 are oriented in a second circular direction around the second hub side 30 and are oriented toward the second-side, circular locus of second-side spoke reception rim channels 44 at the inside-hub-to-rim angle 38.

Preferably, the overall set of spokes includes a subset of spokes connected between the hub reception positions for outer, first-side spokes 22 and the first-side, circular locus of first-side spoke reception rim channels 42. A subset of spokes is connected between the hub reception positions for inner, first-side spokes 20 and the first-side, circular locus of first-side spoke reception rim channels 42. A subset of spokes is connected between the hub reception positions for outer, second-side spokes 26 and the second-side, circular locus of second-side spoke reception rim channels 44, and a subset of spokes is connected between the hub reception positions for inner, second-side spokes 24 and the second-side, circular locus of second-side spoke reception rim channels 44.

With the specific embodiment of the invention described, the first-side, circular locus of first-side spoke reception rim channels 42 and the second-side, circular locus of second-side spoke reception rim channels 44 are spaced apart from each other by approximately 0.48 inches. More specifically, each of the first-side, circular locus of first-side spoke reception rim channels 42 and each of the second-side, circular locus of second-side spoke reception rim channels 44 are spaced apart from the medial rim plane 48 by approximately 0.24 inches.

The first circular direction is opposite the second circular direction. The first circular direction can be clockwise, and the second circular direction can be counterclockwise.

The spoke-to-hub connection means include hub-located spoke reception wells, and external-thread-receiving spoke well inserts are installed in the hub-located spoke reception wells. The external threads of the hub spoke ends 58 are engaged with respective spoke well inserts for connecting the respective spokes to the hub assembly 14.

As shown in the embodiment of the invention shown in FIGS. 1–7, the hub-located spoke reception wells include axially oriented hub-located spoke reception wells 80, and the spoke well inserts include axially oriented spoke well inserts 72. Each spoke well insert 72 is comprised of a metal which has a hardness greater than the hardness of the hub assembly 14 and greater than the hardness of the spokes. The hard spoke well inserts 72 provide a secure connection between the hub spoke ends 58 and the hub-located spoke reception wells 80.

Turning to FIGS. 8–10, a second embodiment of a portion of the invention is shown. Reference numerals are shown that correspond to like reference numerals that designate like elements shown in the other figures. In addition, the hub-located spoke reception wells include transversely oriented spoke nut reception wells 63 in the hub assembly 14, and the spoke well inserts include transversely oriented spoke well inserts 82 that are installed into the transversely oriented spoke nut reception wells 63. The transversely oriented spoke well inserts 82 can be regarded as nut cylinders 82.

Each of the transversely oriented spoke well inserts 82 includes an internally threaded outer spoke reception well 76 which is oriented at an outside-hub-to-rim angle 40, and includes an internally threaded inner spoke reception well 74 which is oriented at an inside-hub-to-rim angle 38. The outside-hub-to-rim angle 40 is greater than the inside-hub-to-rim angle 38.

Figure 3:
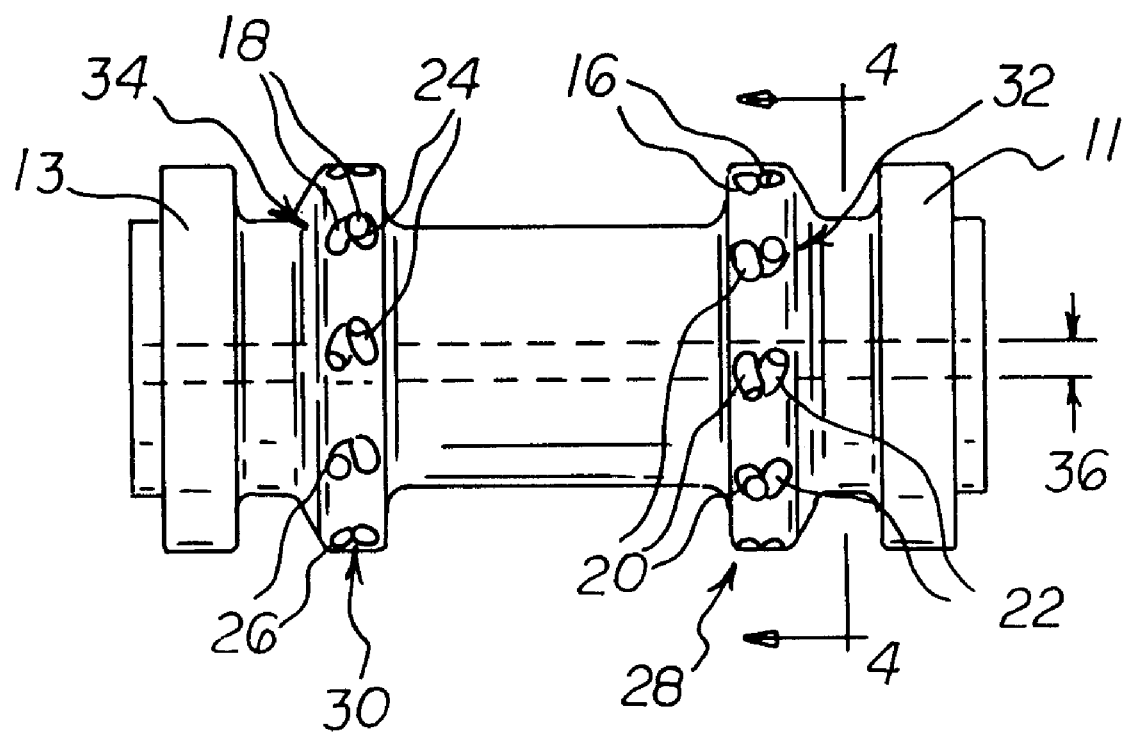
FIG. 3 is an enlarged cross-sectional view of the embodiment of the spoked wheel apparatus of FIG. 2 taken along line 3—3 thereof.
Figure 4:
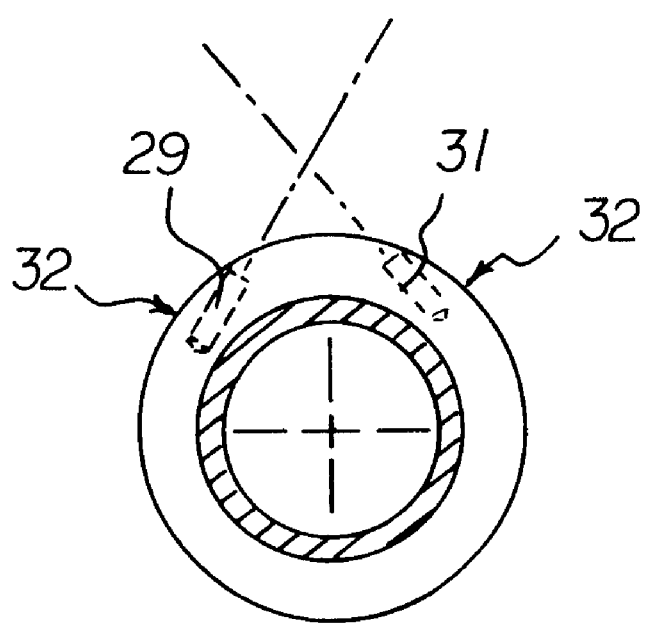
FIG. 4 is a partial cross-sectional view of the embodiment of the invention shown in FIG. 3 taken along line 4—4 thereof.

As shown in FIG. 3, the hub offset angle 36 between first-hub-side spoke reception positions 32 and second-hub-side spoke reception regions 34 is provided so that, on the wheel rim portion 12, the totality of spoke reception rim channels of the first-side, circular locus of first-side spoke reception rim channels 42 and the second-side, circular locus of second-side spoke reception rim channels 44 are evenly distributed around the wheel rim portion 12 circumferentially.

Figure 5A:
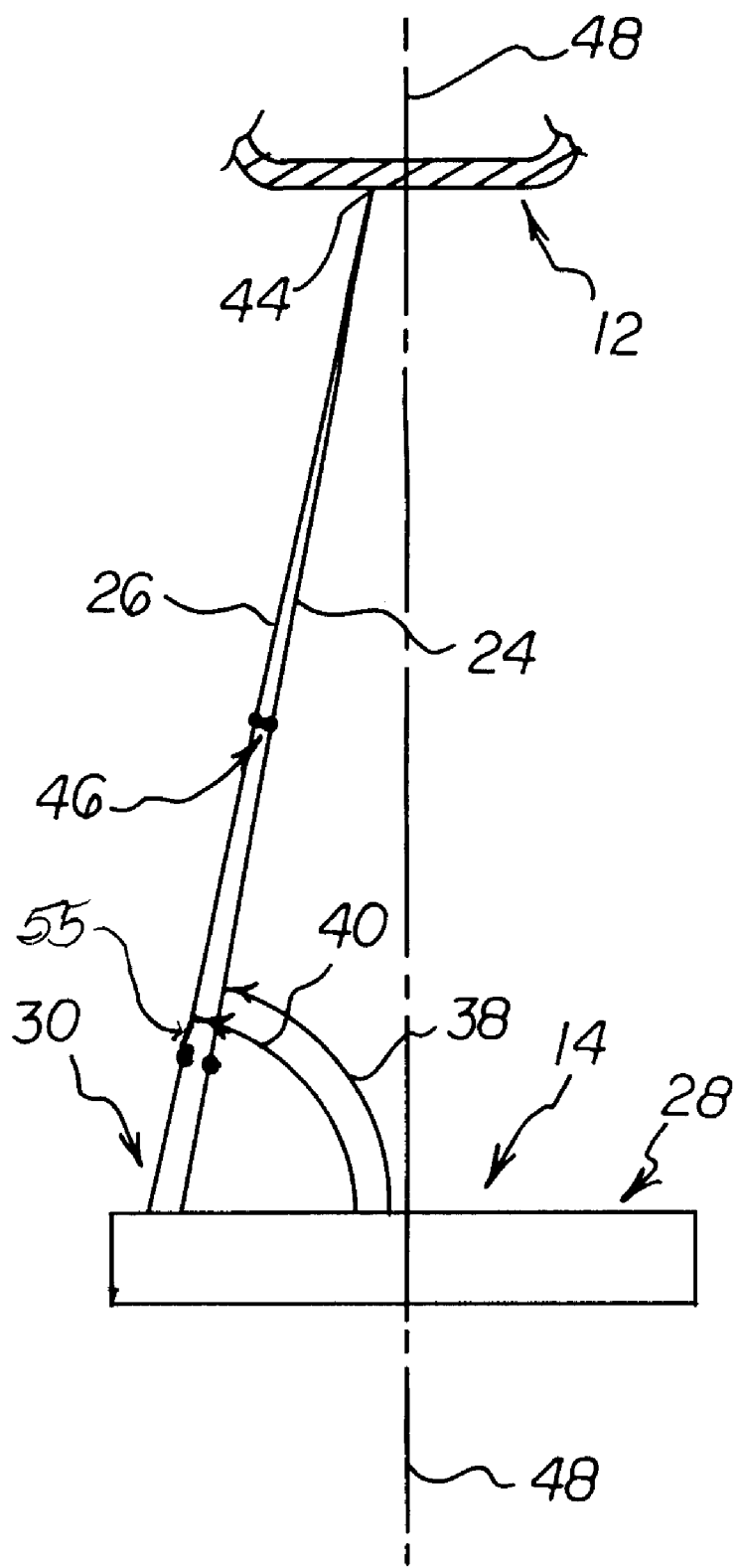
FIG. 5A is a schematic diagram based on the cross-sectional view of FIG. 5, particularly illustrating how an inner spoke and an outer spoke come into contact with each other at an intermediate inner-and-outer-spoke interference region.

In accordance with another aspect of the invention, with particular reference to FIGS. 5–7, the spoked wheel apparatus 10 includes a wheel rim portion 12 which includes rim-located spoke reception channels. A hub assembly 14 includes hub-located spoke reception channels. An overall set of spokes is connected between the wheel rim portion 12 and the hub assembly 14. Each spoke in the overall set of spokes includes a rim spoke end 60 and a hub spoke end 58, and each respective rim spoke end 60 and hub spoke end 58 is externally threaded. Spoke-to-rim connection means are provided for connecting each respective rim spoke end 60 to each respective rim-located spoke reception channel. Spoke-to-hub connection means are provided for connecting each hub spoke end 58 to each respective hub-located spoke reception channel.

Preferably, the spoke-to-rim connection means include an internally threaded spoke-to-rim nipple 62 received in a respective rim-located spoke reception channel for receiving a respective rim spoke end 60. An interior nipple seal 68 is located inside the spoke-to-rim nipple 62. An exterior nipple-to-rim seal 66 is located between the spoke-to-rim nipple 62 and the respective rim-located spoke reception channel. A nipple cap 70 is connected to a top portion of the spoke-to-rim nipple 62 for retaining the interior nipple seal 68 inside the spoke-to-rim nipple 62. Each respective rim-located spoke reception channel is inwardly bevelled or countersunk.

Preferably, the exterior nipple-to-rim seal 66 is in a form of an elastic O-ring 66, and the interior nipple seal 68 is in a form of an elastic ball 68. The nipple cap 70 includes a cup-like bottom surface 78 for receiving the elastic ball 68. The exterior nipple-to-rim seal 66 and the interior nipple seal 68 provide an air-tight seal between each spoke and each rim-located spoke reception channel. The exterior nipple-to-rim seal 66 provides an especially effective air-tight seal against the inwardly bevelled spoke reception channels. As a result, the spoked wheel apparatus 10 of the invention can be used with tubeless tires. With a tubeless tire, the tire can slip on the wheel rim portion 12 without damaging a valve stem.

The principles of the present spoked wheel apparatus of the invention are applicable to a wide variety of types of spoked wheels. In this respect, the present spoked wheel apparatus of the invention can be employed with a wide variety of numbers of spokes for a wide variety of sizes of hub assemblies and wheel rim portions. However, for purposes of illustration and explanation, detailed disclosures are set forth for a spoked "dirt tracker" motorcycle wheel assembly of the invention that employs 19 inch tires.

The internal diameter of the wheel rim portion 12 is approximately 17.62 inches. The spokes are approximately 8.75 inches long and have a diameter of approximately 0.125 inches.

As shown in the drawings, the overall set of spokes can include 40 spokes. Of the overall 40 spokes, there are 20 first-side spokes and 20 second-side spokes. Of the 20 first-side spokes, there are 10 outer, first-side spokes 22 and 10 inner, first-side spokes 20. The 10 outer, first-side spokes 22 are oriented clockwise, and the 10 inner, first-side spokes 20 are oriented counterclockwise.

Of the 20 second-side spokes, there are 10 outer, second-side spokes 26 and 10 inner, second-side spokes 24. The 10 outer, second-side spokes 26 are oriented clockwise, and the 10 inner, second-side spokes 24 are oriented counterclockwise.

As depicted in FIG. 3, the hub-reception-position offset angle or angular displacement 36 between the spokes on the first hub side 28 and the spokes on the second hub side 30 is 9 degrees. As shown in FIG. 5, The outside-hub-to-rim angle 40 is 12.5 degrees, and the inside-hub-to-rim angle 38 is 11 degrees.

Since a circle has 360 degrees, with the use of overall set of 40 spokes, each of the 40 spokes is separated from an adjacent spoke by 9 degrees around the inner circumference if the wheel rim portion 12. It is noted that 9 degrees of circumferential rim separation is equal to the hub-reception-position offset angle 36 which is also 9 degrees for the current embodiment described.

Considering either the 20 first-side spokes or the 20 second-side spokes, and considering that a circle has 360 degrees, each spoke on one side of the hub assembly 14 is separated from an adjacent spoke on the same side by 18 degrees around the inner circumference of the respective circular locus of spoke reception rim channels.

With 20 side spokes attached to each side of the hub assembly 14, and with alternating hub positions having either a clockwise-oriented or counterclockwise-oriented spoke, there are 10 inner-and-outer-spoke interference regions 46 for each hub side. Since a circle has 360 degrees, each of the 10 inner-and-outer-spoke interference regions 46 for a side is positioned around an inner circumference of the spoked wheel apparatus 10 at 36 degree intervals.

The inner-and-outer-spoke interference regions 46 occur between non-adjacent hub spoke positions for a particular side. Spokes connected to adjacent hub positions do not contact each other at an inner-and-outer-spoke interference region 46. More specifically with reference to FIG. 8, the internally threaded outer spoke reception well 76 in the transversely oriented spoke well insert 82 is received in spoke nut reception well 63 and receives outer, first-side spoke 54 which is oriented clockwise. An adjacent spoke nut reception well 64 receives a transversely oriented spoke well insert 82, and the inner, first-side spoke 51 is received in the respective internally threaded inner spoke reception well 74 and is oriented counterclockwise.

The inner, first-side spoke 51 and the outer, first-side spoke 54 cross at crossing area 55, but they do not contact each other at the crossing area 55. Actually, the inner, first-side spoke 51 and the outer, first-side spoke 54 miss each other by approximately 0.010 inches. As stated above, an outer, first-side spoke 22 and a non-adjacent inner, first-side spoke 20 contact each other at an inner-and-outer-spoke interference region 46.

From the above description, it is noted that at each respective hub position, a particular transversely oriented spoke well insert 82 receives either an outer, first-side spoke 54 or an inner, first-side spoke 51, but does not receive both at the same time. It is further noted that each transversely oriented spoke well insert 82 has both a internally threaded outer spoke reception well 76 and an internally threaded inner spoke reception well 74. This is so to provide that a particular transversely oriented spoke well insert 82 can interchangeably and selectively receive either an outer, first-side spoke 54 or an inner, first-side spoke 51.

Figure 2:
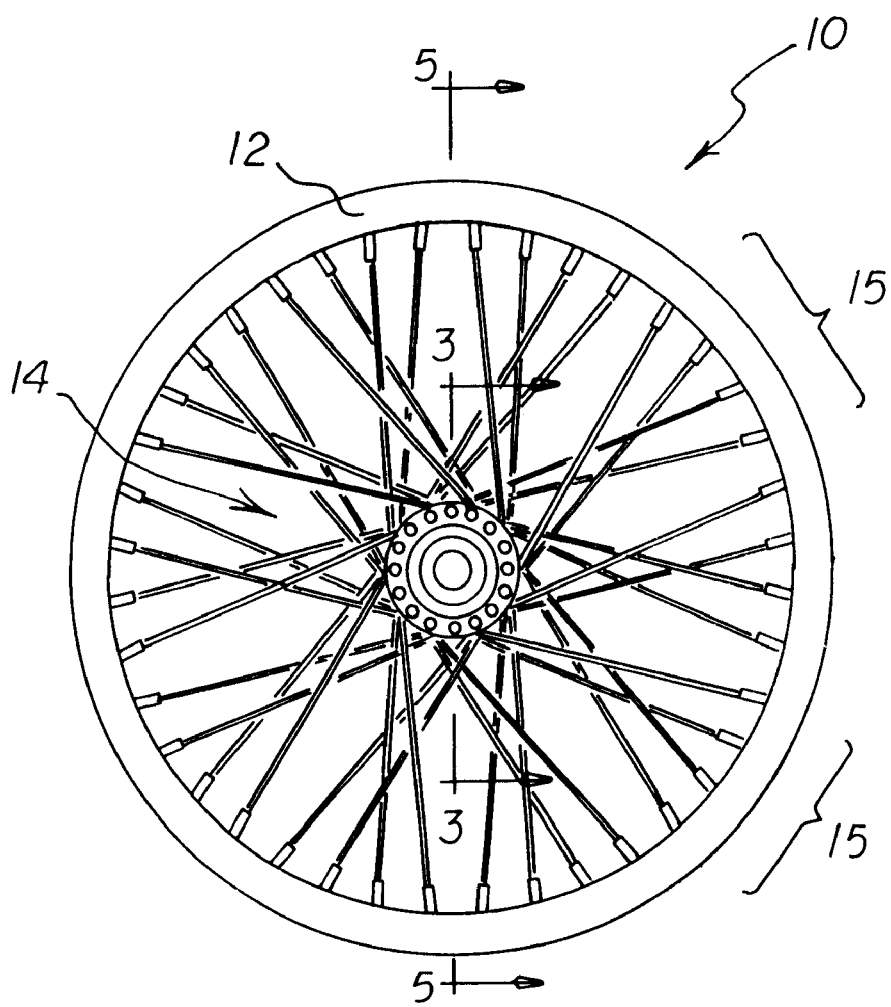
FIG. 2 is an enlarged first-side view of the embodiment of the spoked wheel apparatus shown in FIG. 1.

It is noted that the spoke, hub, and rim arrangement described above for 40 spokes provides 10 repetitive patterns 15 of four spokes each, as shown in FIG. 2. The repetitive patterns 15 of 4 spokes each are arrayed around the 360 degree circle of the wheel rim portion 12 at 36 degree intervals. It is noted that motorcross wheels generally have 36 spokes, and a spoked wheel apparatus 10 in accordance with the invention can be provided with 36 spokes.

The components of the spoked wheel apparatus of the invention can be made from inexpensive and durable metal materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved spoked wheel apparatus that is low in cost, relatively simple in design and operation, and which may advantageously be reversible. With the invention, a spoked wheel apparatus is provided which complies with American Tire and Rim Association Motorcycle Tubeless specifications. With the invention, a spoked wheel apparatus is provided which is symmetrical about a medial plane. With the invention, a spoked wheel apparatus is provided which includes threads at both ends of the spokes. With the invention, a spoked wheel apparatus is provided which can employ tubeless tires. With the invention, a spoked wheel apparatus is provided which includes spoke well inserts that provide a strong, stress-resistant connection between threaded ends of spokes and spoke reception wells. With the invention, a spoked wheel apparatus provides intermediate support between the hub and rim ends.

Still additional benefits are obtained by using the principles of the invention. For example, a lighter weight wheel assembly apparatus is provided. Metal has been removed from the outer bead flanges, and the reduced weight reduces rotational mass. Also, the tire bead ring is reinforced at an angle which is steeper than the inside bead angle. This increases stiffness at this part of the rim section.

The wheel assembly apparatuses of the invention can be formed by lathe turning. This provides a more accurate and smoother rim, and allows a better seal for the tire. The wheel assembly apparatuses of the invention employ a reduced diameter necessary to machine the hub and attach the spokes. With the wheel assembly apparatuses of the invention, spoke threads are rolled, starting with rod whose rod diameter equals the pitch diameter of the spokes. The weakest part of the spoke is located at the root diameter, right next to the uncut portion. With the wheel assembly apparatuses of the invention, weight is saved by starting with rod whose diameter is equal to the pitch diameter of the spoke, as opposed to starting with a rod whose rod diameter is larger than the pitch diameter of the spoke. For example, with the wheel assembly apparatuses of the invention, the rod employed has a rod diameter of 0.141 inches, as opposed to a conventional rod diameter of 0.156 inches. In this respect, there is a small reduction in weight, but a vast improvement in providing a clean appearance, as well as reducing hub material.

With the wheel assembly apparatuses of the invention, the hubs are one piece as opposed to some versions of bolt-on adapters. The bearings are outboard as far as possible to take advantage of the wider "offsets" of the newer engines being used. From aesthetic or cosmetic considerations, the wheel assembly apparatuses of the invention provide superior appearance than existing products.

The wheel assembly apparatus of the invention can be used with motorcycles, other than the "dirt tracker" motorcycle discussed above. Also, the wheel assembly apparatus of the invention can be used on for use on the front or rear of the motorcycle. Moreover, the wheel assembly apparatus of the invention can be used on spoke wheel vehicles other than motorcycles.

With the wheel assembly apparatuses of the invention, nipples and rim countersinks are designed to use elastomeric seals. This allows a tubeless tire. The tire can actually slip on the rim without fear of tearing the valve stem. Alternatively, the wheels can use a tube if desired.

The nipple/rim interface at the inwardly bevelled spoke reception channels is designed to compress the exterior nipple-to-rim seal in the shallow countersink of the inward bevel. A small included angle allows self centering and a very positive "stabbing" retention. Combining this feature with the fact that the spokes are pre-aligned in tapped holes in the hub assembly helps to keep the wheel assembly tautly positioned. With the wheel assembly apparatuses of the invention, the nipples can be made of an aluminum-nickel-bronze alloy. This material resists galling and is very strong. No plating is required.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A spoked wheel apparatus, comprising:

a wheel rim portion which includes a circular locus of spoke reception channels, a hub assembly which includes a first hub side and a second hub side, wherein said first hub side includes reception positions for outer, first-side spokes and reception positions for inner, first-side spokes, wherein said reception positions for outer, first-side spokes are oriented in a first circular direction around said first hub side and are oriented toward said circular locus of spoke reception channels at an outside-hub-to-rim angle, and wherein said reception positions for inner, first-side spokes are oriented in a second circular direction around said first hub side and are oriented toward said circular locus of spoke reception channels at an inside-hub-to-rim angle, wherein said second hub side includes reception positions for outer, second-side spokes and reception positions for inner, second-side spokes, wherein said reception positions for outer, second-side spokes are oriented in a first circular direction around said second hub side and are oriented toward said circular locus of spoke reception channels at said outside-hub-to-rim angle, and wherein said reception positions for inner, second-side spokes are oriented in a second circular direction around said second hub side and are oriented toward said circular locus of spoke reception channels at said inside-hub-to-rim angle, wherein said outside-hub-to-rim angle is greater than said inside-hub-to-rim angle, wherein said reception positions in said first hub side for said first-side spokes are offset from respective reception positions in said second hub side for said second-side spokes by a hub-reception-position offset angle, and an overall set of spokes interconnected between said wheel rim portion and said hub assembly, wherein said overall set of spokes includes a subset of spokes connected between said hub reception positions for outer, first-side spokes and said circular locus of spoke reception channels, a subset of spokes connected between said hub reception positions for inner, first-side spokes and said circular locus of spoke reception channels, a subset of spokes connected between said hub reception positions for outer, second-side spokes and said circular locus of spoke reception channels, and a subset of spokes connected between said hub reception positions for inner, second-side spokes and said circular locus of spoke reception channels, whereby, because said outside-hub-to-rim angle is greater than inside-hub-to-rim angle, said outer, first-side spokes and said inner, first-side spokes engage in interference contacts at respective locations between said circular locus of spoke reception channels and said first hub side, and whereby said outer, second-side spokes and said inner, second-side spokes engage in interference contacts at respective locations between said circular locus of spoke reception channels and said second hub side.

2. The apparatus of claim 1 further including spoke-to-rim connection means for connecting said spokes to said wheel rim portion, and spoke-to-hub connection means for connecting said spokes to said hub assembly.

3. The apparatus of claim 1 wherein said wheel rim portion which includes a first-side, circular locus of first-side spoke reception channels and a second-side, circular locus of second-side spoke reception channels, wherein each of said first-side, circular locus of first-side spoke reception channels and said second-side, circular locus of second-side spoke reception channels are or opposite sides of a medial rim plane.

4. The apparatus of claim 3 wherein:

said first hub side includes reception positions for outer, first-side spokes and reception positions for inner, first-side spokes, wherein said reception positions for outer, first-side spokes are oriented in a first circular direction around said first hub side and are oriented toward said first-side, circular locus of first-side spoke reception rim channels at an outside-hub-to-rim angle, and wherein said reception positions for inner, first-side spokes are oriented in a second circular direction around said first hub side and are oriented toward said first-side, circular locus of first-side spoke reception rim channels at an inside-hub-to-rim angle, and said second hub side includes reception positions for outer, second-side spokes and reception positions for inner, second-side spokes, wherein said reception positions for outer, second-side spokes are oriented in a first circular direction around said second hub side and are oriented toward said second-side, circular locus of second-side spoke reception rim channels at said outside-hub-to-rim angle, and wherein said reception positions for inner, second-side spokes are oriented in a second circular direction around said second hub side and are oriented toward said second-side, circular locus of second-side spoke reception rim channels at said inside-hub-to-rim angle.

5. The apparatus of claim 3 wherein said overall set of spokes includes a subset of spokes connected between said hub reception positions for outer, first-side spokes and said first-side, circular locus of first-side spoke reception rim channels, a subset of spokes connected between said hub reception positions for inner, first-side spokes and said first-side, circular locus of first-side spoke reception rim channels, a subset of spokes connected between said hub reception positions for outer, second-side spokes and said second-side, circular locus of second-side spoke reception rim channels, and a subset of spokes connected between said hub reception positions for inner, second-side spokes and said second-side, circular locus of second-side spoke reception rim channels, whereby, because said outside-hub-to-rim angle is greater than inside-hub-to-rim angle, said outer, first-side spokes and said inner, first-side spokes engage in interference contacts at respective locations between said first-side, circular locus of first-side spoke reception rim channels and said first hub side, and whereby said outer, second-side spokes and said inner, second-side spokes engage in interference contacts at respective locations between said second-side, circular locus of second-side spoke reception rim channels and said second hub side.

6. The apparatus of claim 1 wherein said first circular direction is opposite said second circular direction.

7. The apparatus of claim 6 wherein:

said first circular direction is clockwise, and said second circular direction is counterclockwise.

8. The apparatus of claim 2 wherein said spoke-to-hub connection means include:

hub-located spoke reception wells, and external-thread-receiving spoke well inserts placed in said hub-located spoke reception wells, wherein external threads of said hub spoke ends are engaged with respective spoke well inserts for connecting said respective spokes to said hub assembly.

9. The apparatus of claim 8 wherein:

said hub-located spoke reception wells include axially oriented hub-located spoke reception wells, and said spoke well inserts include axially oriented spoke well inserts.

10. The apparatus of claim 8 wherein said each spoke well insert is comprised of a metal having a hardness greater than the hardness of said hub assembly and greater than the hardness of said spokes.

11. The apparatus of claim 8 wherein:

said hub-located spoke reception wells include transversely oriented spoke nut reception wells in said hub assembly, and said spoke well inserts include transversely oriented spoke well inserts that are installed into said transversely oriented spoke nut reception wells.

12. The apparatus of claim 11 wherein each of said transversely oriented spoke well inserts includes:

an internally threaded outer spoke reception well which is oriented at an outside-hub-to-rim angle, and an internally threaded inner spoke reception well which is oriented at an inside-hub-to-rim angle, wherein said outside-hub-to-rim angle is greater than said inside-hub-to-rim angle.

13. A spoked wheel apparatus, comprising:

a wheel rim portion which includes rim-located spoke reception channels, a hub assembly which includes hub-located spoke reception channels, an overall set of spokes connected between said wheel rim portion and said hub assembly, wherein each spoke in said overall set of spokes includes a rim spoke end and a hub spoke end, wherein each respective rim spoke end and hub spoke end is externally threaded, spoke-to-rim connection means for connecting each respective rim spoke end to each respective rim-located spoke reception channel, and spoke-to-hub connection means for connecting each hub spoke end to each respective hub-located spoke reception channel, wherein said spoke-to-rim connection means include:

an internally threaded spoke-to-rim nipple received in a respective rim-located spoke reception channel for receiving a respective rim spoke end, an interior nipple seal located inside said spoke-to-rim nipple, an exterior nipple-to-rim seal located between said spoke-to-rim nipple and said respective rim-located spoke reception channel, a nipple cap connected to a top portion of said spoke-to-rim nipple for retaining said interior nipple seal inside said spoke-to-rim nipple.

14. The apparatus of claim 13 wherein each respective rim-located spoke reception channel is inwardly bevelled.

15. The apparatus of claim 13 wherein:

said exterior nipple-to-rim seal is in a form of an elastic O-ring, said interior nipple seal is in a form of an elastic ball, and said nipple cap includes a cup-like bottom surface for receiving said elastic ball.

16. A spoked wheel apparatus, comprising:

a wheel rim, a hub, spokes connected between said wheel rim and said hub, wherein each spoke includes a rim spoke end and a hub spoke end, wherein each respective rim spoke end and hub spoke end is externally threaded, wherein each spoke externally threaded end is connected to said wheel rim and said hub, wherein each spoke is angularly oriented to the other spokes such that every spoke crosses at least one other spoke intermedially between said hub and said wheel rim and interferes therewith to place the crossing spokes in a pre-loaded tension condition between said wheel rim and said hub.

\* \* \* \* \*